Figure 1:
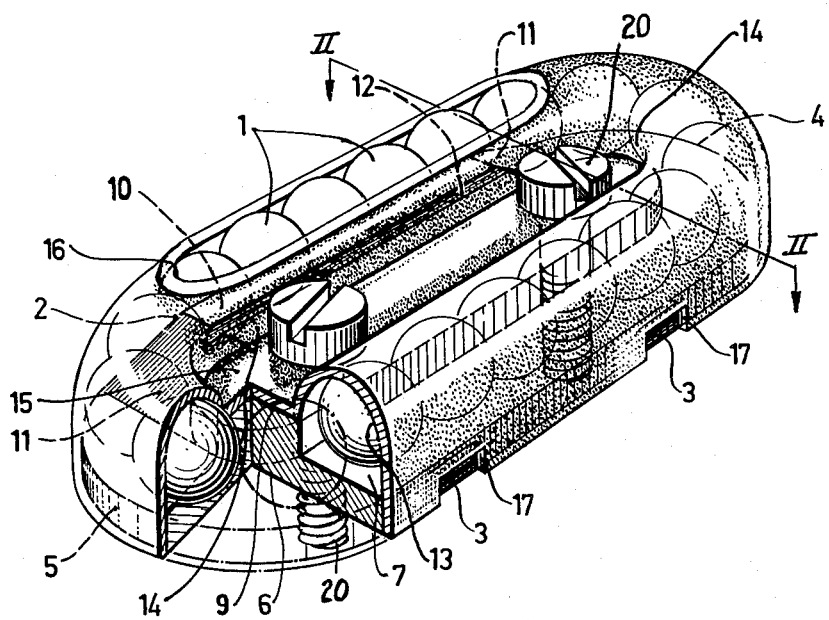

Aug. 29, 1961   H. S. V. JÄRUND   2,998,286
BLOCK BEARING
Filed May 2, 1958

INVENTOR
Harry Sigurd Valdemar Järund
By Pierce, Scheffler & Parker
Attorneys 2,998,286
BLOCK BEARING
Harry Sigurd Valdemar Järund, Otto Lindblags Vag 18, Lund, Sweden
Filed May 2, 1958, Ser. No. 732,656
2 Claims. (Cl. 308—6)

The present invention relates to block bearings of the type including a series of balls substantially filling an endless channel for guiding same in an endless track, the bottom wall of said ball guiding channel constituting a ball raceway and comprising, on one hand, a lower level section for that portion of said series of balls running idly and, on the other, an elevated section for those balls protruding out of said ball guiding channel to take the load exerted by a ball race surface parallel to at least part of said elevated raceway section.

Block bearings of the kind in question are previously known, e.g. through U.S. Patent No. 2,681,836 disclosing a block bearing comprising a block having a cavity the inner wall of which together with a central bar removable inserted in said cavity define an endless ball guiding channel having higher and lower level raceway sections for balls under load and for balls running idly respectively. At least along the idle raceway section of the ball guiding channel said central bar has a top edge rib extending laterally to retain the balls in the ball guiding channel.

At least the elevated section of the ball guiding channel raceway is formed by a bar which is removeably inserted into the block and may or may not be made in one piece with said central bar.

The block bearing in question is to be mounted on a load bearing member by means of screws or the like simultaneously serving to position the two or more block bearing parts in relation to each other.

Since both its insert portion or portions and its hollowed block portion require high precision manufacture and assembly to ensure the exactness necessary when mounting the bearing between relatively moveable machine elements the bearing unit according to the above-mentioned U.S. patent has turned out to involve too high production and mounting costs to warrant its use but in very special applications.

It is an object of the invention to remove the above-mentioned drawbacks of block bearings of the type referred to by the provision of a block bearing which is ready for use and can be handled as a unit to be easily mounted between relatively movable machine elements to take the load exerted by one of said elements upon the other.

Another object of the invention consists in the provision of a block bearing of the type referred to which is of a simple low production cost construction.

Still another object of the invention consists in the provision of a block bearing of the type referred to which in addition to a series of balls comprises only two parts to be easily assembled to define the ball guiding channel.

Figure 2:
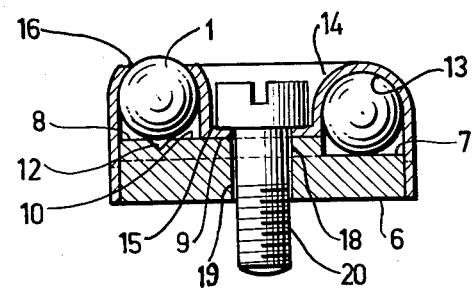

Other objects and details of my invention will become apparent from the following description taken in conjunction with the accompanying drawing:

FIG. 1 is a perspective view, partly in section of the improved block bearing, and FIG. 2 is a vertical cross sectional view of block bearing taken on line II—II, in FIG. 1.

In addition to a number of bearing balls 1 of the same size the improved block bearing comprises, on one hand, a base plate and, on the other, a sheet metal cover. The base plate is of elongated shape having two parallel long sides 2 and 3 as well as two congruent curved short sides 4 and 5 connecting said long sides 2 and 3. The bottom face of the base plate is planar whilst the top face thereof comprises two surfaces 7 and 8 on different levels and parallel to the bottom face 6, the elevated surface 8 comprising, on one hand, the top face of a central portion 9 substantially symmetrically within the outer contour 2, 4, 3, 5 of the base plate and of the same shape and, on the other, the top face of a substantially rectangular side portion 10 projecting from said central portion 9 to one side thereof, said rectangular side portion 10 being of less longitudinal extension than said central portion 9 and by one of its long sides coinciding with the corresponding long side 2 of the base plate. An inclined surface 11 at each short side of the rectangular side portion 10 forms a smooth passage between the elevated surface 8 and the lower level surface 7 of the base plate top surface, the lower surface 7 for the remainder of its length being defined by the edge lines of the central portion 9 in the corresponding plane.

The top face of said portion 10 is provided with a relatively shallow guiding groove 12 for the balls 1 under load, said guiding groove 12 being substantially parallel to the corresponding long side 2 of the base plate.

During the operation of the improved block bearing the balls 1 roll along the elevated raceway section 8 guided by the groove 12 therein, travel down one inclined bridge surface 11 onto the lower level idle raceway section 7, pass along one substantially semicircular portion, the substantially rectilinear portion, and the other substantially semicircular portion thereof, and finally roll up the other inclined bridge surface 11 onto the elevated raceway section 8. The diameter of the balls 1 corresponds substantially to the width of the side portion 10.

The sheet metal cover serves both to retain the balls 1 on the base plate and to guide the balls 1 on their raceway. In the embodiment of the improved block bearing shown on the drawing the cover is integrally punched out of a sheet metal piece, part of its inner face substantially defining a surface which, when a ball 1 travels along its closed track, will be generated by a curve consisting of the upper semi-circle of the contour line of the ball 1 in a plane passing through the centre of the ball 1 and perpendicular to the travelling direction thereof as well as to the bottom face 6 of the base plate, and, on one hand, a tangential line in the same plane from the inner end point of said semicircle to the intersection of the corresponding tangent and the elevated surface 8 of the base plate top face, and, on the other hand, a tangential line in the same plane from the outer end point of said semicircle to the intersection of the corresponding tangent and the raceway surface portion in question. Thus when punching out the cover there are embossed in the same an internal endless groove 13 corresponding to the track of the balls 1 as well as an external elongated recess 14 having a plane bottom 15 the corresponding inside of which engages the top face of said central portion 9 of the base plate and is of the same length. Either during or after the punching and embossing operation the cover is provided with a slot 16 along that portion of its groove 13 which is aligned with the elevated raceway section 8 where the balls 1 are under load, said slot exposing the raceway section 8 contacting portions of said balls 1 under load. The slot 16 is substantially parallel to the guiding groove 12 along most of its length and tapers at both ends.

The cover shown in the drawing is arranged so that the interior surface of its outer side wall engages the whole of the base plate side edge 2, 4, 3, 5 except for small indentations 17 in the outer cover side wall, said indentations exposing corresponding portions of the base plate side edge 2 for ensuring exact positioning of the bearing when mounting same. This is preferred to use of the outside of the punched cover for positioning purposes since such surface is not as accurate as the machined side edge 2 of the base plate.

The bottom 15 of the external recess 14 is provided with two holes 18 each in alignment with a hole 19 passing through the base plate. By means of two screws 20 to be inserted into said holes 18 and 19, the cover and the base plate may be rigidly connected to each other and simultaneously as a bearing unit be secured to a supporting surface.

Within the scope of the invention there are, of course, numerous possible modifications of the construction shown and described. Thus, the cover inside need not engage the base plate along the whole of the side edge 2, 4, 3, 5 thereof but might as well engage only a portion thereof to position it relative to the base plate.

I claim:

1. A block bearing consisting of three elements, one of said elements being a base plate having a lower face adapted to be secured to a support and an upper face constituted by two spaced rectilinear track portions at higher and lower levels respectively connected at their ends by inclined and curvilinear track portions thereby to establish an endless trackway, the second of said elements being a series of balls filling said endless trackway, said higher level rectilinear track portion being parallel with said bottom face and constituting the load bearing surface in direct contact with said balls, and the third of said elements being a sheet metal cover for said base plate and balls, said cover including an endless ball retaining and guiding channel overlying and of the same configuration as said endless trackway on said base plate, and said cover being interrupted along that portion of the guide channel overlying said higher level track portion of said base plate so as to expose the upper portions of the balls on the same.

2. A block bearing as defined in claim 1 wherein said cover extends downwardly along and in engagement with at least a portion of the side face of said base plate to position the same relative to said base plate.

References Cited in the file of this patent

UNITED STATES PATENTS

| Re. 12,093 | Wands | Mar. 3, 1903 |
| 640,397 | Merker | June 2, 1900 |
| 713,183 | Wands | Nov. 11, 1902 |
| 719,951 | Norwood | Feb. 3, 1903 |
| 766,113 | Norwood | July 26, 1904 |
| 2,681,836 | Jarund | June 22, 1954 |